J. JANIK.
RAIL JOINT.
APPLICATION FILED MAR. 5, 1920.

1,347,376.

Patented July 20, 1920.
2 SHEETS—SHEET 1.

Witnesses:—
Benj Kahn

Inventor
Johan Janik
By Victor J. Evans
Attorney

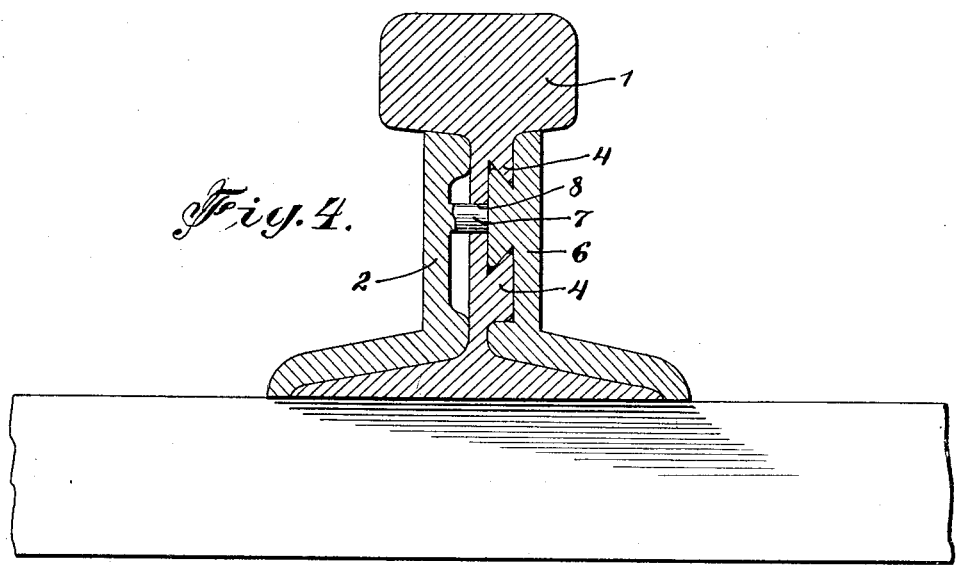
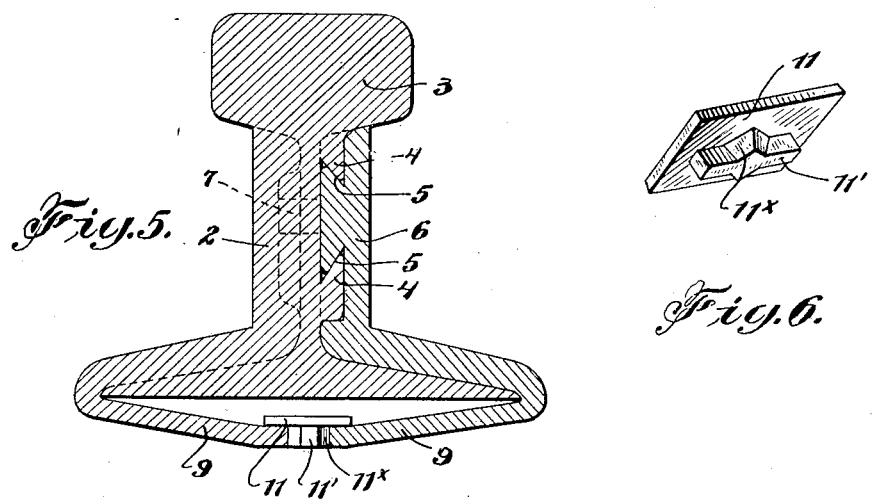

UNITED STATES PATENT OFFICE.

JOHAN JANIK, OF JOHNSTOWN, PENNSYLVANIA.

RAIL-JOINT.

1,347,376.  Specification of Letters Patent.  Patented July 20, 1920.

Application filed March 5, 1920. Serial No. 363,371.

*To all whom it may concern:*

Be it known that I, JOHAN JANIK, a citizen of Czecho-Slovakia, residing at Johnstown, in the county of Cambria, and State of Pennsylvania, have invented new and useful Improvements in Rail-Joints, of which the following is a specification.

This invention relates to rail joints and the principal object is to provide an overlapping joint, one member of which is moved longitudinally to free the rails with means for locking said member to the other member to prevent this longitudinal movement.

Another object of the invention is to provide a small piece of rail which is adapted to be placed between the adjacent ends of two rails and a pair of fish plates connected with said piece of rail, one plate being slidably connected therewith.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 4 is a section on line 4—4 of Fig. 1.

Fig. 5 is a view showing how the bottom extensions on the fish plates are connected together.

Fig. 6 is a detail view.

Figure 1:
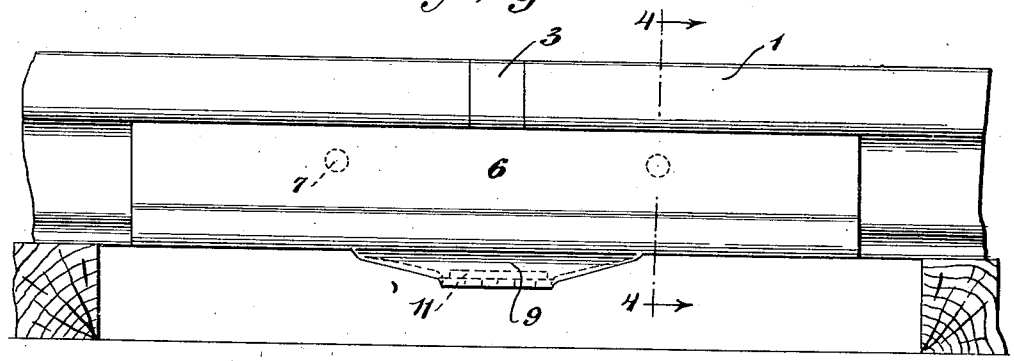
Figure 1 is a side elevation showing my invention in use.
Figure 2:
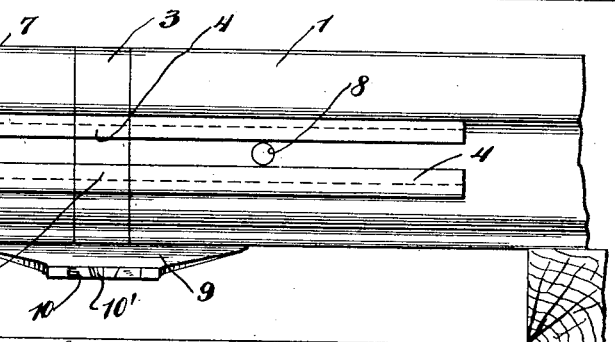
Fig. 2 is a like view with one of the fish plates removed.
Figure 3:
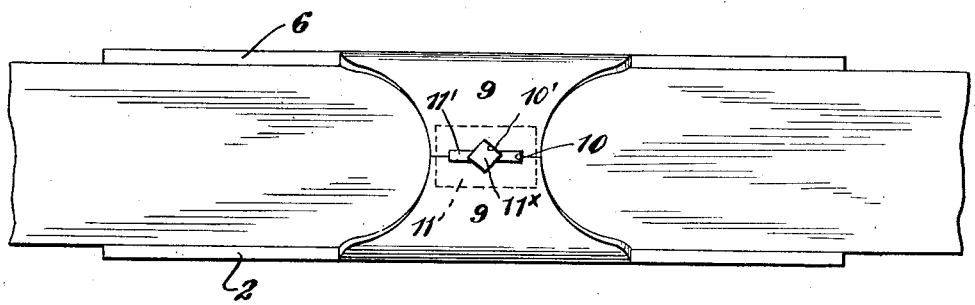
Fig. 3 is a bottom view.

In these views 1 indicates the rails and 2 indicates a fish plate for engaging one side of these rails in the usual manner, this plate overlapping the ends of the two rails. This fish plate, at its center, carries a member 3 which is of the same cross sectional shape as the rails and may be formed from a small piece of rail. This member, on its outer side of its web, is provided with a pair of under cut keys 4 which are adapted to engage the under cut grooves 5 formed in the second fish plate 6. These grooves extend from end to end in the inner face of said fish plate so that said plate must be moved longitudinally to engage it with or disengage it from said keys. These plates are adapted to engage both sides of the rails and the stationary plate may be provided with the projections 7 for engaging holes 8 formed in the web of the rails so as to lock the rails to the fish plates.

In order to lock the movable fish plate against longitudinal movement I provide each plate with an inwardly extending extension 9 on its lower edge, said extensions being of such dimensions that they will abut each other when the parts are assembled and a space will be left between their inner faces and the bottoms of the rails. Each extension, at its outer edge is provided with a recess 10 which has its central part formed with a V-shaped extension 10' with inclined walls so that when the two extensions 9 are placed together the recess will form an opening with V-shaped notches formed in the walls. This opening is adapted to receive a locking plate 11 which is provided with a part 11' adapted to fit in said opening and this part has V-shaped extensions $11^x$ on its sides for engaging the extensions 10'. When this plate is in place the movable fish plate will be locked to the stationary plate and cannot be moved longitudinally.

When the rails are to be removed it is simply necessary to remove the locking plate 11 and then slide the movable plate longitudinally to free it from the keys on the member 3 and when the plate is removed the rails may be disengaged from the projections on the stationary plate.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A rail joint comprising a pair of fish plates, means for connecting one plate with the rails, a member carried by said plate of the same cross sectional shape as the rails and adapted to fit between the ends of the rails, said second fish plate having longitudinally extending keyways therein, keys on said member for engaging said keyways and means for locking said second plate against movement.

2. A rail joint comprising a pair of fish plates, a member connected with one of said plates and of the same cross sectional shape as the rails and adapted to fit between the ends of the rails, means for connecting the rails to said plate, keys on said member, keyways on the second plate for engaging said keys, inwardly and downwardly extending flanges connected with the lower edges of the fish plates, said flanges having their free edges abutting each other and said edges having recesses formed therein to form an opening when the flanges are abutting each other and a locking plate having a portion fitting said opening to prevent longitudinal movement of the movable plate.

In testimony whereof I affix my signature.

JOHAN JANIK.